Fig. 1

WILLIAM W. T. CRANE
CARLILE R. STEVENS
INVENTORS

BY Roger A. Marra

July 29, 1969 W. W. T. CRANE ET AL 3,458,414
SWIMMING POOL WATER CONDITIONER

Filed Nov. 24, 1967 5 Sheets-Sheet 2

INVENTORS
WILLIAM W. T. CRANE
CARLILE R. STEVENS
BY
Roger A. Marrs

United States Patent Office 3,458,414
Patented July 29, 1969

3,458,414
SWIMMING POOL WATER CONDITIONER
William W. T. Crane, P.O. Box 498, and Carlile R.
Stevens, 1000 Ironwood Place, both of Alamo, Calif.
94507
Filed Nov. 24, 1967, Ser. No. 685,348
Int. Cl. C02b 1/82
U.S. Cl. 204—149                                30 Claims

ABSTRACT OF THE DISCLOSURE

The swimming pool water conditioner disclosed herein electrolyzes dissolved halogen salts present in the water to provide the oxidizer for this service. An electrolytic cell is incorporated in a control system which provides proper powering of the cell, together with the necessary safeguards to operation. Additionally, the conditioner includes a chemical dispenser which is used to inject a halogen acid to provide the desired halogen and to clean the cell.

BACKGROUND OF THE INVENTION

Field of the invention

This invention is directed to a swimming pool water conditioner which includes an electrolytic cell and the appropriate control and safeguard equipment for the safe electrolysis of soluble salts in the swimming pool water.

Description of the prior art

It is well known that swimming pools or other bodies of water that must be purified must contain an oxidizing agent which kills bacteria and algae to keep the swimming pool water clear. Additionally, the oxidizing agent must be tolerable to human contact and even consumption so that swimming in the pool is safe. This has long been accomplished by the addition of chlorine to the pool water. The addition has been accomplished in large pools by the introduction of gaseous chlorine directly into the swimming pool water as it is circulated externally of the pool through the filtering system. In smaller pools, it is accomplished by the introduction of sodium or calcium hypochlorite dissolved in water directly into the main water body within the pool.

While the gaseous chlorine method is economical, pressurized tanks of gaseous chlorine are dangerous to handle, because of the toxic qualities of the gaseous chlorine. The gaseous chlorine method has the advantage over the sodium hypochlorite in water method because it is more susceptible to continuous feed, and is more economical for use in larger pools. For smaller pools, the use of sodium hypochlorite in water has the disadvantage of intermittent and fairly uncontrolled application. Also, other chemicals are available for the introduction of chlorine into swimming pool water. For the most part, these other chemicals are aimed at a slower release of chlorine into the pool water in contrast to the inherently fast release available for the introduction of chlorine into swimming pool water. For the most part, these other chemicals are aimed at a slower release of chlorine into the pool water in contrast to the inherently fast release when sodium hypochlorite in aqueous solution is used as the chlorine source. However, these chemicals are fairly expensive and contain organic chlorine stabilizing compounds which reduce the effectiveness sometimes almost completely.

While previous attempts have been made to create a system including the electrolysis of swimming pool water for the production of purifying oxidizers, the previous electrolytic cell designs have not been suitable for the production of proper electrolytic products and the equipment has not incorporated the required control systems for the electrolytic cell so that it produces the proper constituents and its operation is properly safeguarded. For example, calcium compounds tend to collect on the electrodes which eventually cause the destruction thereof.

SUMMARY OF THE INVENTION

The difficulties and problems encountered with prior systems are obviated by this invention which is directed to a water body conditioner that includes an electrolytic cell which electrolyzes the salt constituents of the water body such as held in a swimming pool to produce a nascent dissolved oxidizer within the water for return to the swimming pool. This oxidizer maintains the water clear by oxidation of organic matter therein to prevent the growth of bacteria and algae. Electrolysis is accomplished by a cell which produces the optimum electrolytic result. Furthermore, control equipment associated with the cell properly controls the cell operation and maintains this optimum product output. Additionally, protective devices monitor cell operation to cause electrolytic cell shut-down upon the occurrence of a system component malfunction. Furthermore, a chemical injector is provided with this system which chemical injector adds material required for electrolysis, cleans the cell and is connected to the control system for shut-down of the system upon improper operating conditions.

Accordingly, it is a primary object of the present invention to provide a novel water conditioner which includes an electrolytic cell that produces optimum oxidizer product for maintenance of purity of the water.

It is another object of this invention to provide a novel swimming pool water conditioner which includes automatic means for controlling the electrolytic cell so that it operates at optimum output independent of other variables.

It is a further object of this invention to provide a water conditioner which includes a chemical injector for the injection of chemicals into the pool water such as muriatic acid for example.

It is another object to provide a water conditioner system which incorporates safety controls operating in conjunction with the electrolytic cell for the shut-down of the electrolysis process when inadequate water flow through the cell occurs.

Still another object of the present invention is to provide a water conditioner with safety controls so that automatic shut-down occurs upon inadequate circulating water pressure.

It is still another object of the invention to provide an integrated system for swimming pool water conditioning which automatically maintains the proper constituents in the swimming pool water to maintain it clear and pure and to prevent the growth of algae and bacteria.

It is still another object of this invention to provide an inexpensive swimming pool water conditioner which is designed for efficient, long-lived and maintenance-free operation.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

DESCRIPTION OF THE PREFERRED EMBODIMENT

Figure 1:
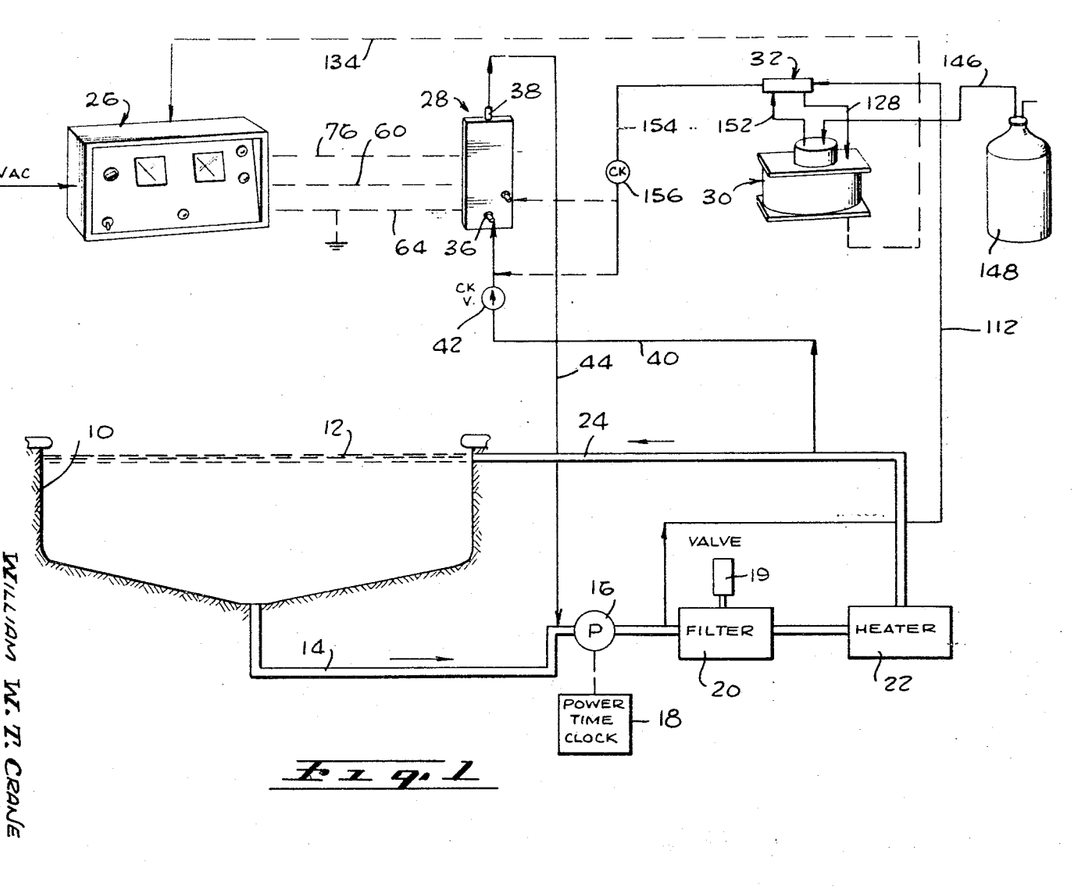
FIGURE 1 is a schematic drawing of the novel swimming pool water conditioner of this invention in its relationship to a swimming pool system.
Figure 2:
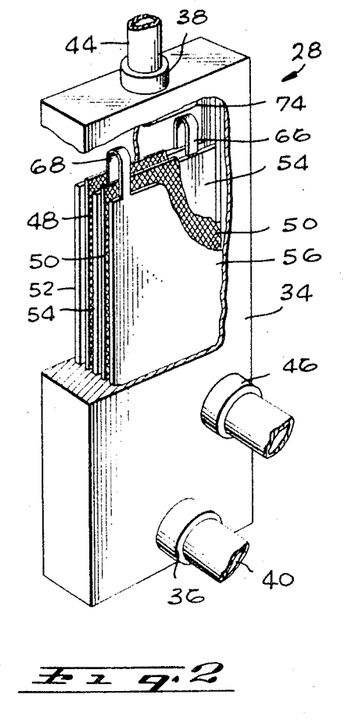
FIGURE 2 is an isometric view, with parts broken away, of the preferred embodiment of the electrolytic cell incorporated into the system shown in FIGURE 1.

FIGURE 1 illustrates the swimming pool water conditioner in association with a conventional swimming pool. Swimming pool 10 contains a body of pool water 12 which is drawn through suction line 14 by means of a pool circulating pump 16. Pool water circulating pump 16 is a conventional pump, preferably electrically driven and controlled by a time clock 18 so that the pump 16 circulates water for a predetermined number of hours each day. Pump 16 pumps pool water through a filter 20 wherein particular contaminants in the water are filtered out. A gas relief valve 19 is employed to remove gaseous electrolysis products from the circulating system. In the conventional pool, water discharged from filter 20 passes through a heater 22 and thence, by means of a return line 24 back into the pool 10. Some pool systems do not have a heater so that the discharge from filter 22 goes directly to return line 24. While a subsurface pool 10 is illustrated, it is clear that the swimming pool water conditioner of this invention is equally applicable to a pool which is mounted on top of the ground. The swimming pool water conditioner comprises a control unit 26, an electrolytic cell 28 and a chemical injector 30 with its control valve 32.

Referring now to FIGURES 1, 2, 3 and 4, cell 28 comprises a hollow body 34 which has an inlet connection 36 and an outlet connection 38. As is seen from FIGURE 1, inlet connection 36 is connected by line 40 through check valve 42 to receive water from return line 24. Outlet connection 38 is connected by line 44 to suction line 14 adjacent pump 16, so that water flows through the hollow interior of cell body 34 from return line 24 back to the lower pressure point at the suction side of pump 16. Flow of water through the circulating system including the suction line 14, pump 16, the filter and heater as well as return line 24, creates a pressure differential between the points where lines 40 and 44 are tapped into the circulating system. This pressure differential is such that proper flow rate is created through the cell, as long as there is reasonable flow through the circulating system of the pool. Check valve 42 prevents return flow when pump 16 has shut down. The relative pressure drops in lines 14 and 24 are such that during normal operation the interior of electrolytic cell 28 is slightly below atmospheric pressure so that should any leaks develop, they will draw air into the cell, rather than permit the release of water and the products of the electrolysis. In addition to the other connections on body 34, the body 34 of electrolytic cell 28 is provided with an acid inlet 46.

Conventional filters include a manual air relief valve for discharging the air which tends to accumulate in the filter reducing its efficiency. However, by including valve 19, this air, as well as any other gaseous products developed during electrolysis, are vented to atmosphere whereby overall system efficiency is enhanced.

Within the interior of the body 34, anodes 48 and 50 are spaced from cathodes 52, 54 and 56. Anodes 48 and 50 are made of titanium wire mesh holding platinum foil therebetween. The anodes are joined together at the bottom and extend out at terminal 58 which is connected to line 60 (see FIGURES 1 and 9). Cathode 52 extends out of the bottom of body 34 to terminal 62 which in turn is connected to line 64. Loop 66 electrically interconnects cathodes 52 and 54 while loop 68 electrically interconnects cathodes 54 and 56. The cathodes are made of stainless steel. As is seen in FIGURE 4, the anodes and cathodes may be spaced from each other by being placed in slots in the interior walls which define the cavity within body 34 or by any other convenient means.

Figure 3:
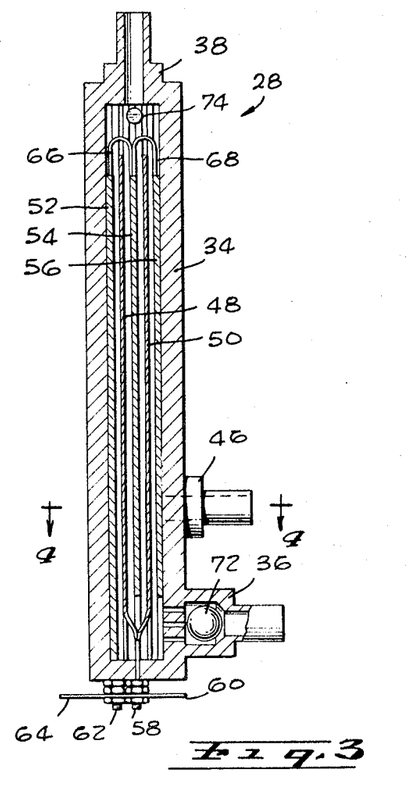
FIGURE 3 is a longitudinal sectional view taken through the cell of FIGURE 2.
Figure 4:
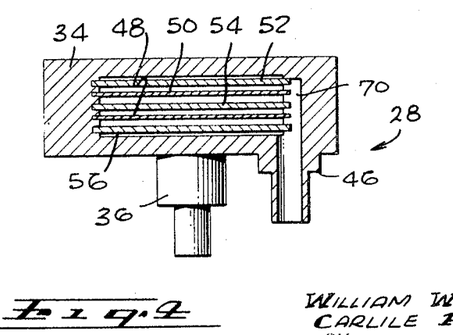
FIGURE 4 is a transverse sectional view as taken generally in the direction of arrows 4—4 of FIGURE 3.

As is also seen in FIGURE 4, acid inlet 46 communicates with the spaces between each of the anodes and cathodes by means of passage 70 which extends past the edges of the anodes and cathodes. Similarly, as is seen in FIGURE 3, cathodes 54 and 56, as well as anodes 48, and 50, terminate short of the bottom of the cavity so that the passage within inlet connection 36 communicates with the spaces between each of the anodes and cathodes. Furthermore, check value 72 is formed as a part of electrolytic cell 28, and may be an alternative replacement for check value 42. Positioned within the interior of cell 28, preferably adjacent the outlet connection 38, is temperature sensor 74. Conveniently, sensor 74 is a thermistor which signals temperature changes to indicate excessively high temperatures at that point to indicate an insufficient flow of liquid. As such, temperature sensor 74 is a detector which controls the cell for the safe operation thereof. It is connected to control unit 26 by means of line 76.

The material of cathodes 52, 54 and 56 is stainless steel. Preferably, the material of anodes 48 and 50 is two layers of expanded titanium mesh with platinum foil retained therebetween. These materials are such that they are not consumed by the chemical products of the electrolytic reaction, and they do not retain on their surfaces in an acid environment, the products of deposition from the swimming pool water due to either the electrolytic reaction or the slight heating.

Figure 5:
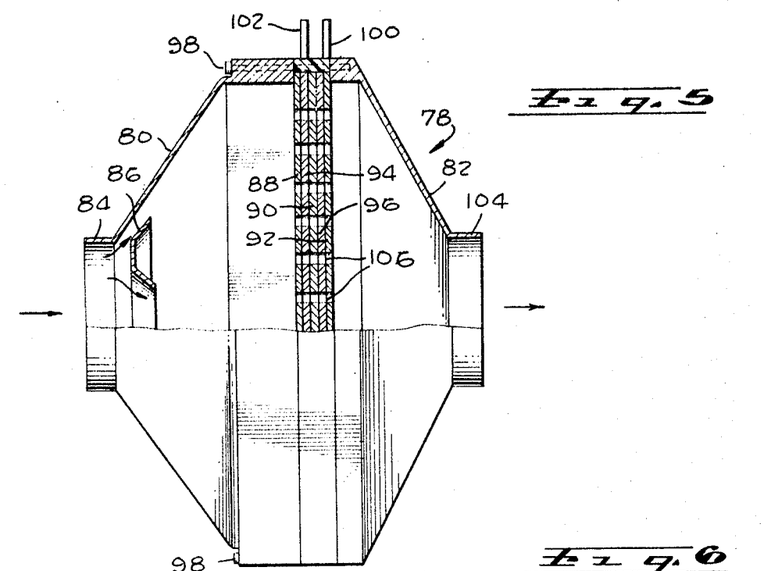
FIGURE 5 is a side elevational view, with a portion thereof broken away, of another embodiment of an electrolytic cell usable in connection with this invention.
Figure 6:
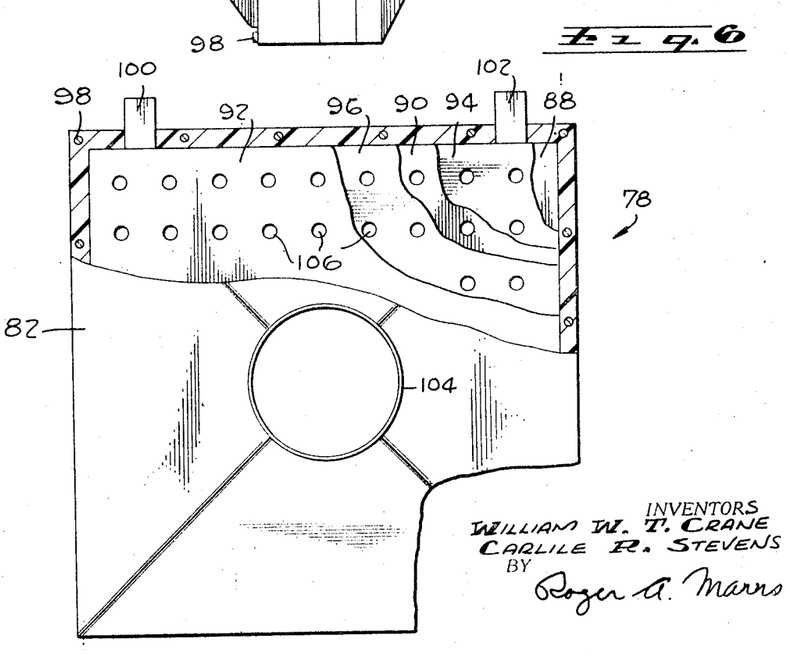
FIGURE 6 is an end elevational view of the electrolytic cell of FIGURE 5, with parts broken away.

An alternative cell is indicated generally at 78 in FIGURES 5 and 6. Cell 78 comprises housings 80 and 82 which are bolted together and retain the anodes and cathodes in position therein. Housing 80 carries inlet nozzle 84, and directly inside nozzle 84 is positioned diverter 86. Diverter 86 causes turbulence in the water entry inlet nozzle 84 to distribute the water flow. The plates retained between housings 80 and 82 comprise cathodes 88, 90 and 92 between which are positioned anodes 94 and 96. Thin layers of electrical insulation material are positioned between the anodes and cathodes so that they are electrically isolated from each other. Teflon sheet is a suitable material for this purpose as well as other suitable insulation. However, if desired, Teflon material can be directly applied to and baked upon both surfaces of both anodes 94 and 96 to accomplish this electrical separation. The anodes and cathodes are held in position lying next to each other by the insulation by being bounded by the material of the cell housing. Screws 98 hold the housing halves together so that the anodes and cathodes are maintained in place.

The anodes and cathodes are arranged to be connected to an electric supply circuit. Cathode connector 100 is connected to cathode 92 and extends exteriorly of the housing for connection into the electric circuit. Cathode connection 100 is connected to cathode 92, and the remaining cathodes 88 and 90 are internally connected to cathode 92 so that they are at the same potential. Similarly, anode connector 102 extends from anode 94 to a position external of the housing for connection into the electric circuit. Anode 96 is internally connected to anode 94 so that it remains at the same potential. As is seen in FIGURES 5 and 6, each of the anodes and cathodes has a plurality of holes therethrough for accommodating passage of the water. These aligned holes provide through water passages from inlet nozzle 84 to outlet nozzle 104. Furthermore, these holes, generally indicated at 106, provide adjacent surfaces on the anodes and cathodes so that electrolysis of the water occurs at the surfaces and in the holes. Since these holes carry the full flow of water through cell 78, the products of electrolysis are quickly carried away from the electrolysis area to prevent saturation or further unnecessary electrolytic breakdown. By reasons of this design, cell 78 is also useful in the system of FIGURE 1. Since the cell 78 does not have a built-in check valve as shown, external check valve 42 is required. However, a built-in check valve may be employed, if desired.

Figure 9:
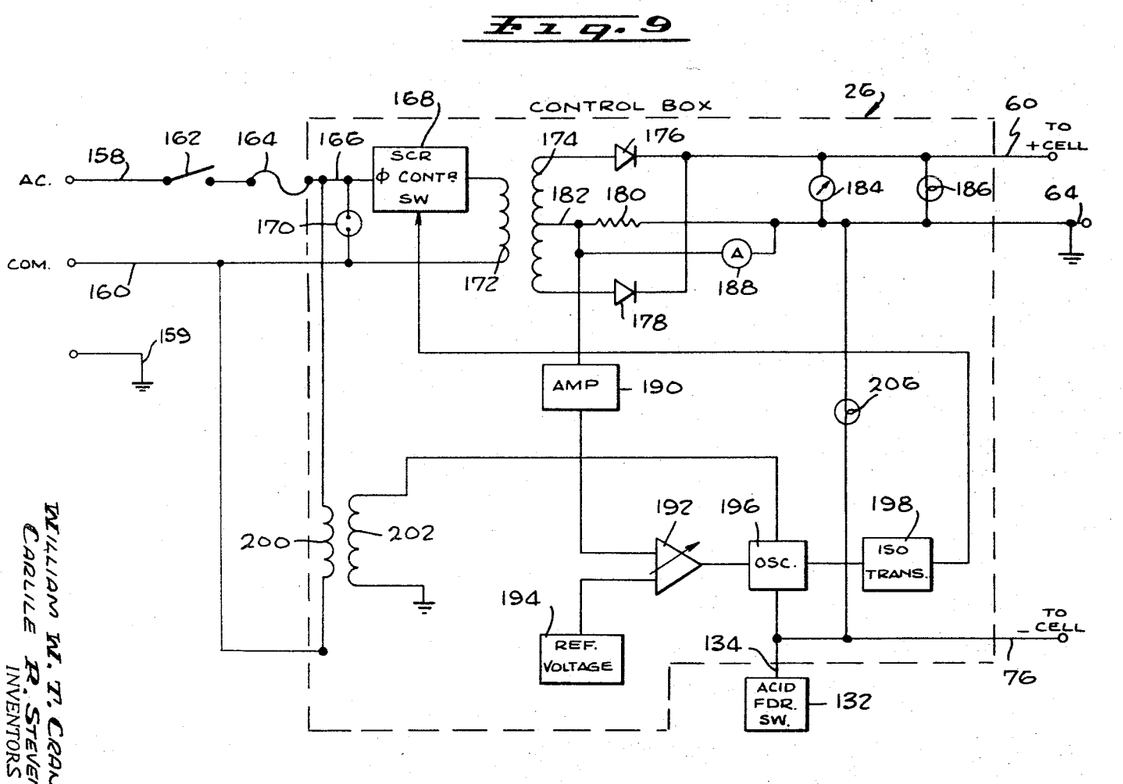
FIGURE 9 is a schematic diagram showing the essentials of the control unit for controlling the swimming pool water conditioner of this invention.

It is to be noted with respect to cell 78 that there is an odd number of electrodes and that both of the outside electrodes are cathodes. Furthermore, as is seen in FIGURE 9, the cathodes are connected to ground so that there is no possibility of circulating current in the pool water due to the electrolytic cell. Thus, despite the fact that electrolysis current circulates in the pool water in the cell, the water in the pool is protected against having any of this electrolysis current from flowing in the pool itself. Swimmers are thus protected.

The primary salt dissolved in swimming pool water is sodium chloride. In old pools, the salt comes from the previously used aqueous sodium hypochlorite which eventually is converted to salt by chemical action in the pool. In new pools, a certain amount of sodium chloride may have to be added. However, electrolysis of sodium chloride in the pool water solution, by means of either the above-described electrolytic cells, produces nascent chlorine and hydrogen. The nascent chlorine quickly combines with the water to produce hypochlorite ions as the primary sterilizing agent. This compound is destroyed by its sterilizing action and sunlight, the end product of which is the chloride ion that is again available for electrolysis. Thus, it is necessary to add hydrochloric acid from time to time to replace the lost chlorine and to neutralize the sodium hydroxide when the hydrogen is liberated during electrolysis. In the above chemical description, chlorine is the illustrative halogen, but it is clear that any of the other halogens will work just as well. All that is necessary is that a halogen salt which is electrolyzable from the pool water solution be present in the pool water. Furthermore, it is necessary to add that halogen for makeup purposes.

Figure 7:
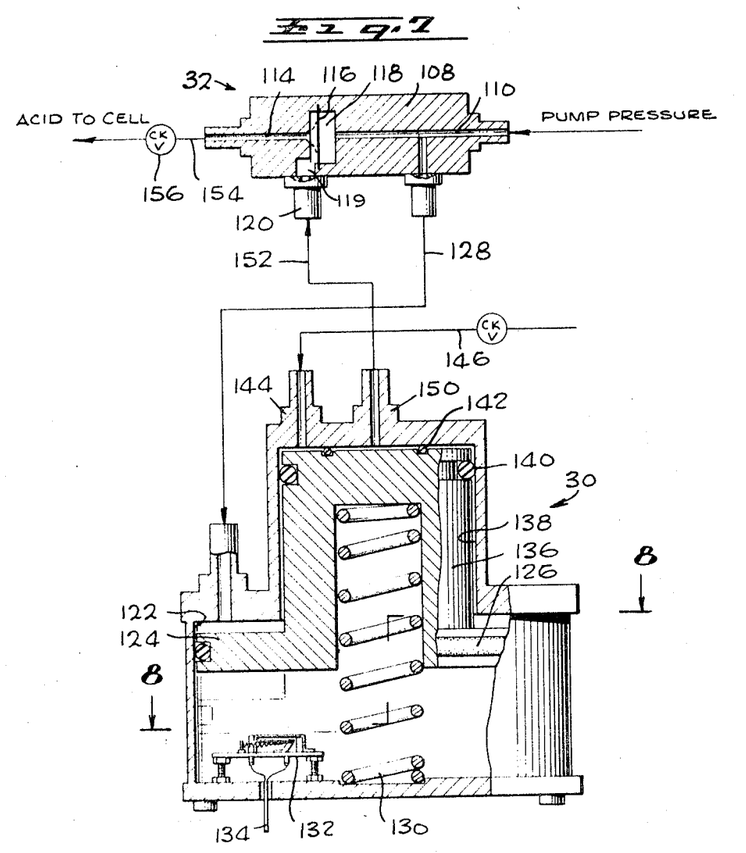
FIGURE 7 is a side elevational view of both the chemical injector and its control valve, with parts broken away, showing the structures primarily in section.
Figure 8:
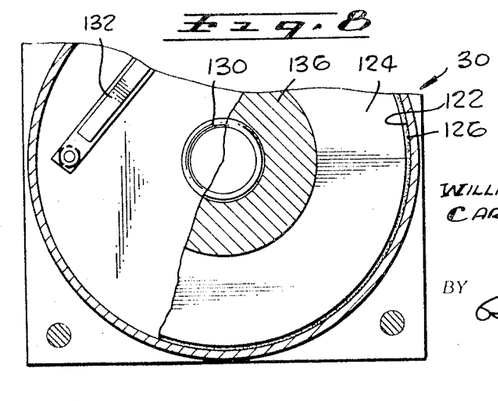
FIGURE 8 is a sectional view as taken generally in the direction of arrows 8—8 of FIGURE 7.

The acid injection is accomplished by chemical injector 30 and its control valve 32. Control valve 32 has a body 108 which has internal passage 110 which is connected to the outlet of pump 16 by line 112. In line with pressure passage 110 is acid passage 114. Diaphragm 116 separates cavities 118 and 119. Diaphragm 116 is so positioned and is of such resiliency that when pump pressure is in pressure passage 110, diaphragm 116 covers the access between acid passage 114 and cavity 119. Thus, acid passage 114 is closed off when the pump pressure is on. However, when the pump is off and passage 110 is not pressurized, the diaphragm assumes a flat position and does not cover the entrance to passage 114. Acid inlet 120 is mounted on the side of housing 108 and is in communication with cavity 119 on the side of diaphragm 116 toward acid passage 114. It is communication between acid inlet 120 and acid passage 114 which is cut off by pump pressure passage 110.

Chemical injector 30 has a drive cylinder 122 in which is positioned drive piston 124. Sealing is maintained therebetween by means of ring seal 126. Pump pressure line 128 is connected to control valve 32 which has a T therein so that line 128 contains the pressure of line 112 from the pressure side of pump 16. Thus, the pressure from pump 16 forces drive piston 124 downwardly. The downward force of the pump pressure against piston 124 is opposed by spring 130. However, the force due to pump pressure is greater than the spring force so that when pump 16 is operating, drive piston 124 is forced downward to the dotted line position. In this position, it closes switch 132, which is connected to control unit 26 by line 134. Thus, switch 132 serves as a signal that pump 16 is operating.

Pump piston 136 is formed directly upon piston 134 and moves with it. Pump piston 136 acts in pump cylinder 138 and is sealed with respect thereto by means of ring seal 140. Additionally, pump piston 136 carries ring seal 142 on its face. Ring seal 142 acts against the blind end of cylinder 138 when the pistons are in raised position, shown in FIGURE 7. Suction port 144 is connected by suction line 146 to acid bottle 148. Suction port 144 is outside of seal 142. Discharge port 150 is inside seal 142 and is connected by line 152 to acid inlet 120. Acid passage 114 is connected to acid line 154 which contains check valve 156. Acid line 154 is connected to cell 28, preferably at acid inlet 46. Chemical injector 30 and its control valve 32 act so that when pump 16 starts, diaphragm 116 closes acid passage 114, and at the same time, pistons 124 and 136 move downward to draw a charge of acid from acid bottle 148 into pump cylinder 138. However, this acid is prevented from reaching the cell because diaphragm 116 closes at acid passage 114. When pump 16 is turned off, both the pressure on the upper side of piston 124 and the pressure against diaphragm 116 are released so that spring 130 returns the pistons to the upper position shown and the acid in cylinder 138 is discharged past diaphragm 116 and through check valve 156 into cell 28. This acid injection directly into the cell removes deposits therein to maintain the cell in optium condition for electrolysis.

Spring 130 may be elminated when there is sufficient negative pressure on top of piston 124 to cause it to move upwardly when the pump 16 is non-operative.

Referring to the schematic circuit of FIGURE 9 which illustrates the electric control circuitry, power is supplied from a conventional power source through lines 158 and 160. Line 160 serves as the common line for the AC power. Earth ground is represented by numeral 159 which connects with the chassis ground. Switch 162 is followed by fuse 164 and they supply the power from line 158 to the control unit. Switch 162 is preferably closed at all times except during servicing, rather than being operated by a time clock. Fuse 164 is connected to line 166 in the control unit and line 166 powers both silicon controlled rectifier switch unit 168 and pilot light 170. Switch unit 168 has its output connected to primary 172 of the main power transformer. The other side of this primary, as well as the other side of pilot light 172 are connected to line 160.

Secondary winding 174 of the power transformer has its legs connected through diodes 176 and 178 to line 60 which is connected to the anode of cell 28. Cathode line 64 from the cell is connected through resistor 180 to line 182 which is center tapped to secondary winding 178. Voltmeter 184 and pilot light 86 are connected between lines 60 and 64. By this means, when SCR switch unit 168 is conducting, rectified power is supplied to electrolytic cell 28.

The voltage generated across resistor 180 is proportional to the current flowing through the electrolytic cell. This voltage is used for two purposes. Firstly, it drives voltmeter 188. Since cell production is directly proportional to the amount of current flowing in the cell, voltmeter 188 can be calibrated directly in the units of chlorine produced. Secondly, the voltage drop across resistance 180 can be used to control the SCR switch unit 168 to maintain the correct current level by controlling the SCR chopping point on incoming waves. To this end, the signal is amplified at 190 and is compared in differential amplifier 192 to a reference voltage supplied by any convenient means such as the Zener diode reference voltage source 194. Differential amplifier 192 is adjustable so that the electrolysis current to the cell is adjustable. The signal from differential amplifier 192 is supplied through oscillator 196 which has its output connected through isolation transformer 198 to SCR switch unit 168. This signal drives the SCR's in the switch unit to cause the rectifiers therein to pass the correct amount of current.

Oscillator 198 has a further signal input. Control transformer primary 200 is connected to line 166 and line 160. An output from its secondary 202 is connected by line 204 to the oscillator 196 so that the oscillator is in phase with the power supplied to SCR switch unit 168 so that the signals from the oscillator are related to the incoming power supply to the switch unit. Secondary 202 of the control transformer can also be used to power other equipment in the circuit. Also connected to oscillator 196 is acid feeder switch 132. When the switch 132 is unactuated by piston 124, it indicates that pump 16 is off and no water is flowing through the electrolysis cell. In this case, by means of connecting line 134, oscillator 196 is shut down and SCR switch unit 160 does not conduct. Furthermore, temperature sensor 74 in the top of cell 28 is connected by line 76 to oscillator 196. When temperature sensor 174 indicates too high a temperature, indicating insufficient water flow, oscillator 196 is also shut down to prevent overheating of cell 28. Pilot light 206 is connected to indicative operative condition of the signalling circuitry.

When connected into the total system, as is illustrated in FIGURE 1, with power on, pump 16 starts circulating water through the filter and heater when the time clock calls for filtration and circulation. Pressure drop created by this pumping across electrolytic cell 28 causes circulation through the cell. Preferably, the pressure drop in the lines is such that the cell operates at a slightly negative pressure to prevent water leaks should leaks occur. The pump pressure in line 112 moves piston 124 downward against spring 130 until switch 132 is actuated. This causes operation of oscillator 196 with consequent switching of switch unit 168 and the supply of power to cell 28. This causes electrolysis to occur. By adjustment of differential amplifier 192, cell current is adjusted by SCR chopping of the incoming AC wave to the proper value as indicated by voltmeter 188. The voltage at voltmeter 184, indicating the voltage on the cell then indicates the amount of dissolved salt in the circulating water. A higher than standard reading on voltmeter 184 indicates the resistance of the water in the cell is higher than standard, indicating a sub-standard amount of salt in the solution. This indicates that salt should be added to maintain proper salinity for proper electrolysis.

As mentioned above, the kind of salt added is a question of the kind of purification desired in the pool water. Sodium chloride, sodium bromide and sodium iodine are suitable. Constant electrolysis current is maintained by differential amplifier 192 so that the proper amount of electrolysis occurs to maintain pool water biologically pure for a clear, sparkling pool. The electrolysis current is maintained constant. However, should the cell water temperature at the top of cell 28 rise to a predetermined level, temperature sensor 74 detects this temperature rise which indicates inadequate water circulation. When it is detected, it shuts down oscillator 196 to prevent damage to cell 28.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:
1. A water conditioner including an electrolytic cell having an anode and a cathode and an inlet and an outlet arranged so that water can be circulated with respect to said anode and cathode for electrolysis of dissolved salts in the water, the improvement comprising:
  control means connected to said electrolytic cell, said control means including means to automatically adjust the electric current to said cell so as to maintain a desired electrolysis current substantially constant;
  said cell containing at least two electrodes, said electrodes lying substantially parallel to each other, a selected one of said electrodes being an anode and the other of said electrodes being a cathode, and the said cathode being electrically grounded; and
  each of said electrodes having a plurality of apertures formed therein in substantially coaxial relationship with respect to corresponding apertures in each of the other electrodes for allowing the passages of water therethrough.

2. The water conditioner of claim 1 wherein
  said control means is operable to detect water temperature in said cell and to signal overtemperature in said cell.

3. A water conditioner including an electrolytic cell having an anode and a cathode and arranged so that water can be circulated with respect to said anode and cathode for electrolysis of dissolved salts in the water, the improvement comprising:
  control means connected to said electrolytic cell, said control means operable to detect the electrolysis current in said cell and to adjust the electric current to said cell so as to maintain a desired electrolysis current substantially constant;
  said cell contains two electrodes, said electrodes lying substantially parallel to each other, a selected one of said electrodes being an anode and the other of said electrodes being a cathode, and said cathode being electrically grounded;
  said cell having a water inlet and a water outlet; and
  temperature sensor means located within said cell adjacent said water outlet to signal overtemperature within said cell, said temperature sensor being connected to said control means.

4. A water conditioner including an electrolytic cell having an anode and a cathode and arranged so that water can be circulated with respect to said anode and cathode for electrolysis of dissolved salts in the water, the improvement comprising:
  control means connected to said electrolytic cell, said control means operable to adjust the electric current to said cell so as to maintain a desired electrolysis current; and
  said cell having a temperature sensor means connected to said control means to prevent current conduction by said control means when cell temperature exceeds a predetermined value.

5. The water conditioner of claim 3 wherein
  said cell contains five electrodes, said electrodes being spaced from each other to permit water passage therebetween, the center electrode and said outer electrodes being cathodes and said intermediate electrodes being anodes, said cathodes being electrically connected to each other and said anodes being electrically connected to each other.

6. The water conditioner of claim 3 wherein
  said inlet connection to said cell contains a check valve to prevent water from leaving said cell through said inlet.

7. The water conditioner of claim 3, wherein
  said cell contains a plurality of electrodes lying adjacent to each other and a plurality of aligned passages extend through said electrodes so that electrodes are in water contact adjacent to each other within said passages.

8. The water conditioner of claim 2 wherein said control means comprises:
  current control means;

a transformer connected to the output of said current control means; and solid state electronic means interconnecting said transformer output to said electrolytic cell so that control of said current control means regulates the current to said cell.

9. The water conditioner of claim 2 wherein
said control means comprises current control means;
a transformer connected to the output of said current control means; and
at least one rectifier connected to the output of said transformer, said rectifier and the output of said transformer being electrically connected to said electrolytic cell so that control of said current control means controls the current to said cell.

10. The water conditioner of claim 9 wherein
a resistor is connected between said cell and said transformer so that the voltage drop across the resistor indicates cell current.

11. The water conditioner of claim 10 wherein
said resistor is connected to said control means to signal cell current to said control means and to maintain said current substantially constant.

12. The water conditioner of claim 11 wherein
the output of said resistor is connected to a control circuit and said control circuit is connected to said current control means, said control circuit including a reference voltage and comparison means for comparing the reference voltage to the voltage across said resistor, said control circuit including a pulse generator;
said comparison means being connected to said pulse generator and said pulse generator being connected to said current control means to regulate said current control means in accordance with the voltage drop across said resistor.

13. The water conditioner of claim 4 including
a valve operably connected to said conditioner to selectively effect the release of gas accumulated therein.

14. The water conditioner of claim 6 wherein
said acid injector comprises a drive cylinder and a drive piston within said drive cylinder;
said drive cylinder being arranged to be pressurized when the water circulates through said cell;
said acid injector further including a pump cylinder and a pump piston within said pump cylinder;
said pump piston being connected to said drive piston to move therewith; and
said pump cylinder being connectable to a supply of acid and to said cell so that upon reciprocation of said pump piston within said pump cylinder, acid is pumped through said cell.

15. The water conditioner of claim 14 wherein
a switch is positioned on said drive cylinder adjacent to said drive piston so that upon movement of said drive piston within said drive cylinder, said switch is actuated, said switch being connected to said control means so that said control means supplies electrolysis current to said cell only when said drive piston is actuated.

16. A water conditioner including an electrolytic cell having an anode and a cathode and arranged so that water can be circulated with respect to said anode and cathode for electrolysis of dissolved salts in the water, the improvement comprising:
control means connected to said electrolytic cell, said control means operable to adjust the electric current to said cell so as to maintain a desired electrolysis current; and
an acid injector, said acid injector being connected to said cell to inject acid into said cell when water circulation ceases through said cell.

17. The water conditioner of claim 16 wherein
a control valve is connected between said acid injector and said cell;
a diaphragm in said control valve; and
pressure connection means on said control valve, said pressure connection means being connected so that said diaphragm prevents acid injection to said cell when water is circulating through said cell.

18. A water conditioner including an electrolytic cell having an anode and a cathode and arranged so that water can be circulated with respect to said anode and said cathode for electrolysis of dissolved salts in the water, the improvement which comprises:
an acid injector having a chamber for holding a quantity of acid therein and being operably coupled to said cell for discharging said acid into said cell when water circulation ceases through said cell.

19. The invention as defined in claim 18 wherein
said acid injector includes a piston and cylinder assemblage operable upon reciprocation to pump said acid into said cell.

20. The invention as defined in claim 18 wherein
said acid injector comprises a drive cylinder and a drive piston within said drive cylinder;
said drive cylinder being arranged to be pressurized when the water circulates through said cell;
said acid injector further including a pump cylinder and a pump piston within said pump cylinder;
said pump piston being connected to said drive piston to move therewith; and
said pump cylinder being connectable to a supply of acid and to said cell so that upon reciprocation of said pump piston within said pump cylinder, acid is pumped through said cell.

21. A swimming pool water conditioning system comprising:
conduit means interconnected by the swimming pool;
pump means coupled in said conduit means for circulating pool water therethrough;
a branch conduit connected into said conduit means in parallel to said pump means adapted to divert a portion of pool water taken from behind said pump means and to return said portion to said conduit means ahead of said pump means;
an electrolytic cell connected in said branch conduit adapted to generate a halogen in said portion of pool water passing therethrough;
circuit means electrically coupled to said electrolytic cell for energizing said cell;
an acid injector connected to said cell and having a holding chamber adapted to store a predetermined amount of acid from a supply of acid; and
reciprocal means movably carried in said injector for forcibly dispensing said amount of acid into said cell under lack of pressurization of said circulating pool water when said portion of pool water circulation terminates through said cell.

22. A swimming pool water conditioning system comprising:
conduit means interconnected by the swimming pool;
pump means coupled in said conduit means for circulating pool water therethrough;
a branch conduit connected into said conduit means in parallel to said pump means adapted to divert a portion of pool water taken from behind said pump means and to return said portion to said conduit means ahead of said pump means;
an electrolytic cell connected in said branch conduit adapted to generate a halogen in said portion of pool water passing therethrough;
circuit means electrically coupled to said electrolytic cell for energizing said cell;
said electrical circuit means includes a temperature sensor mounted on said cell in thermal sensing relationship to said portion of pool water adapted to determine the presence of pool water flow; and
control means included in said electrical circuit means and operatively coupled to de-energize said cell in response to said sensor when the flow of the pool water drops below a predetermined level.

23. A swimming pool water conditioning system comprising:
- conduit means interconnected by the swimming pool;
- pump means coupled in said conduit means for circulating pool water therethrough;
- a branch conduit connected into said conduit means in parallel to said pump means adapted to divert a portion of pool water taken from behind said pump means and to return said portion to said conduit means ahead of said pump means;
- an electrolytic cell connected in said branch conduit adapted to generate a halogen in said portion of pool water passing therethrough;
- circuit means electrically coupled to said electrolytic cell for energizing said cell; and
- said electrical circuit means further including current control means connected to said cell for detecting the electrolysis current in said cell and including means for automatically regulating the electric current to said cell to maintain the electrolysis current substantially constant.

24. The invention as defined in claim 22 wherein
said current control means further includes an electrically resistive element adapted to develop a voltage drop indicative of current in said cell.

25. The invention as defined in claim 24 wherein
said resistive element voltage drop is sensed by said current control means and compared with a reference voltage to regulate the electrolysis current in said cell as a function of any difference therebetween.

26. A swimming pool water conditioning system comprising:
- conduit means interconnected by the swimming pool;
- pump means coupled in said conduit means for circulating pool water therethrough;
- a branch conduit connected into said conduit means in parallel to said pump means adapted to divert a portion of pool water taken from behind said pump means and to return said portion to said conduit means ahead of said pump means;
- an electrolytic cell connected in said branch conduit adapted to generate a halogen in said portion of pool water passing therethrough;
- circuit means electrically coupled to said electrolytic cell for energizing said cell;
- said electrical circuit means further including current control means connected to said cell for detecting the electrolysis current in said cell and including means for automatically regulating the electric current to said cell to maintain the electrolysis current substantially constant;
- said system including a filter coupled in said conduit means adapted to pass the circulating pool water therethrough; and
- a relief valve connected to said filter operable to selectively release accumulated gas to atmosphere from said system which is generated in response to energization of said electrolytic cell.

27. A swimming pool water conditioning system comprising:
- conduit means interconnected by the swimming pool;
- pump means coupled in said conduit means for circulating pool water therethrough;
- a branch conduit connected into said conduit means in parallel to said pump means adapted to divert a portion of pool water taken from behind said pump means and to return said portion to said conduit means ahead of said pump means;
- an electrolytic cell connected in said branch conduit for controllably generating chlorine in said portion of pool water passing therethrough;
- electrical circuit means coupled to said electrolytic cell for selectively energizing said cell when the flow of said portion of pool water passes through said branch conduit; and
- an acid injector connected to said cell to inject acid into said cell when water circulation ceases through said cell.

28. The invention as defined in claim 27 wherein said electrical circuit means includes:
- control means connected to said cell for detecting the electrolysis current in said cell; and
- means for regulating the electric current to said cell so as to maintain the electrolysis current substantially constant.

29. The method of chlorinating a confined relatively large body of water which comprises the steps of:
- adding sodium chloride to the body of water to form a low concentration saline solution;
- removing a portion of the saline solution from the body of water utilizing a pump and conducting it in a stream back to said body of water;
- removing a portion of said stream from the pressure side of the pump and subjecting it to electrolysis to generate chlorine;
- adding acid to said removed portion of said stream; and
- then returning said last mentioned portion to said stream on the other side of the pump.

30. The method as defined in claim 29 including
the steps of detecting the electrolysis current and regulating the electric current to maintain the electrolysis current substantially constant to establish the desired chlorine content in the body of water.

References Cited

UNITED STATES PATENTS

| | | | |
|---|---|---|---|
| 3,351,542 | 11/1967 | Oldershaw et al. | 204—149 |
| 3,361,663 | 1/1968 | Murray et al. | 204—278 |

JOHN H. MACK, Primary Examiner

A. C. PRESCOTT, Assistant Examiner

U.S. Cl. X.R.

204—151, 228, 276, 278; 210—132, 169, 192